US006864004B2

United States Patent
Wilson et al.

(10) Patent No.: US 6,864,004 B2
(45) Date of Patent: Mar. 8, 2005

(54) DIRECT METHANOL FUEL CELL STACK

(75) Inventors: Mahlon S. Wilson, Los Alamos, NM (US); John C. Ramsey, Los Alamos, NM (US)

(73) Assignee: The Regents of the University of California, Los Alamos, NM (US)

( * ) Notice: Subject to any disclaimer, the term of this patent is extended or adjusted under 35 U.S.C. 154(b) by 0 days.

(21) Appl. No.: 10/771,222

(22) Filed: Feb. 3, 2004

(65) Prior Publication Data

US 2004/0197630 A1 Oct. 7, 2004

Related U.S. Application Data

(60) Provisional application No. 60/460,162, filed on Apr. 3, 2003.

(51) Int. Cl.[7] ........................... H01M 8/10; H01M 8/02; H01M 8/24; H01M 2/14
(52) U.S. Cl. .............................. 429/32; 429/34; 429/35; 429/37; 429/38; 429/39
(58) Field of Search ............................ 429/32, 34, 35, 429/37, 38, 39

(56) References Cited

U.S. PATENT DOCUMENTS

| 4,310,605 | A | | 1/1982 | Early et al. ................... 429/18 |
|---|---|---|---|---|
| 6,017,648 | A | * | 1/2000 | Jones .......................... 429/35 |
| 6,071,635 | A | | 6/2000 | Carlstrom, Jr. ............... 429/34 |
| 6,174,616 | B1 | * | 1/2001 | Marvin et al. ................ 429/34 |
| 6,251,308 | B1 | * | 6/2001 | Butler ........................ 252/511 |
| 6,309,773 | B1 | | 10/2001 | Rock ........................... 429/34 |
| 6,623,882 | B2 | | 9/2003 | Yang ........................... 429/39 |
| 6,663,994 | B1 | | 12/2003 | Fly et al. ...................... 429/30 |
| 6,663,997 | B2 | | 12/2003 | Dong et al. ................... 429/39 |
| 6,677,071 | B2 | | 1/2004 | Yang ........................... 429/34 |
| 2002/0071983 | A1 | * | 6/2002 | Rowen et al. ................ 429/34 |
| 2003/0059664 | A1 | * | 3/2003 | Menjak et al. ................ 429/34 |

* cited by examiner

Primary Examiner—Jonathan Crepeau
(74) Attorney, Agent, or Firm—Mark N. Fitzgerald

(57) ABSTRACT

A stack of direct methanol fuel cells exhibiting a circular footprint. A cathode and anode manifold, tie-bolt penetrations and tie-bolts are located within the circular footprint. Each fuel cell uses two graphite-based plates. One plate includes a cathode active area that is defined by serpentine channels connecting the inlet and outlet cathode manifold. The other plate includes an anode active area defined by serpentine channels connecting the inlet and outlet of the anode manifold, where the serpentine channels of the anode are orthogonal to the serpentine channels of the cathode. Located between the two plates is the fuel cell active region.

35 Claims, 13 Drawing Sheets

DIRECT METHANOL FUEL CELL STACK

RELATED APPLICATIONS

This application claims the benefit of provisional application No. 60/460,162 filed on Apr. 3, 2003, titled "Efficient Fuel Cell Stack Design".

STATEMENT REGARDING FEDERAL RIGHTS

This invention was made with government support under Contract No. W-7405-ENG-36 awarded by the U.S. Department of Energy. The government has certain rights in the invention.

FIELD OF THE INVENTION

The present invention relates generally to fuel cell stacks, and, more particularly, to cumulative fuel cell stack improvements yielding improved performance characteristics.

BACKGROUND OF THE INVENTION

There is significant and increasing interest in utilizing direct methanol fuel cells (DMFCs) for portable power applications. Currently, most attention is focused on DMFC sub-watt power systems that are relatively simple. However, more sophisticated systems, providing more than several watts of power, can provide higher power densities. Stack designs for such systems mirror conventional hydrogen fuel cell approaches, i.e., multiple bipolar plates aligned in series with internal manifolds for reactant delivery and removal.

Over the course of the past four years (1999–2003), great strides have been made in the design of Los Alamos National Laboratory (LANL) DMFC stacks and stack components. These in-house designs have exhibited improved performance, as well as an increase in the stack power densities (based on maximum stack power output). Note that the DMFC-60 and 22-cell Palm Power designs are discussed for illustrative purposes only in order to denote the evolving design work at LANL that has lead to the present invention. The designs of the DMFC-60 and 22-cell Palm Power were not published, nor commercially pursued, as such the DMFC-60 and 22-cell Palm Power are not considered prior art.

The first of the stack designs, the DMFC-60, and specifically its FY00 iteration, included metal flow-fields, rectangular bipolar plates, and rectangular endplates. The performance by this design is detailed in FIG. 1, but specific power (W/kg), as detailed in FIG. 2, suffered due to the use of relatively heavy metal hardware.

The second of the stack designs, the 22-cell Palm Power stack, made use of the same basic membrane-electrode assembly (MEA) and GDL (gas diffusion layer) technology as the DMFC-60, but utilized graphite-based bipolar plates (with integrated flow-fields) as well as composite endplates, contributing to a greatly reduced overall stack weight. Performance for the 22-cell Palm Power stack suffered as a result of cell-to-cell variations caused in part from non-optimized flow-field and GDL combinations. However, power density nearly doubled over the DMFC-60 design (see FIG. 2) because of reduced component mass.

The 12-cell stack design of the present invention provides a substantial increase in average cell current density over the 22-cell design (see FIG. 1). This increase is attributed to thinning the bipolar plates, changing the GDL from the cloth-type used for the previous two stack designs to carbon paper type, optimizing the flow-field designs to reduce cell-to-cell variations, increasing the target operating temperature from 70° C. to 75° C., changing the endplate material to a robust carbon composite, and employing relatively heavy gold-coated stainless steel current collectors on each end of the stack. Note that even though the number of cells in the 12-cell stack design was reduced from the 22-cell design, components such as metal current collectors added inactive mass; thus, the overall power density remained constant at about 80 W/kg.

Various objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

In accordance with the purposes of the present invention, as embodied and broadly described herein, the present invention includes a stack of direct methanol fuel cells exhibiting a circular footprint. A cathode and anode manifold, tie-bolt penetrations and tie-bolts are located within the circular footprint. Each fuel cell uses two graphite-based plates. One plate includes a cathode active area that is defined by serpentine channels connecting the inlet and outlet cathode manifold. The other plate includes an anode active area defined by serpentine channels connecting the inlet and outlet of the anode manifold, where the serpentine channels of the anode are orthogonal to the serpentine channels of the cathode. Located between the two plates is the fuel cell active region.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION

Figure 1:
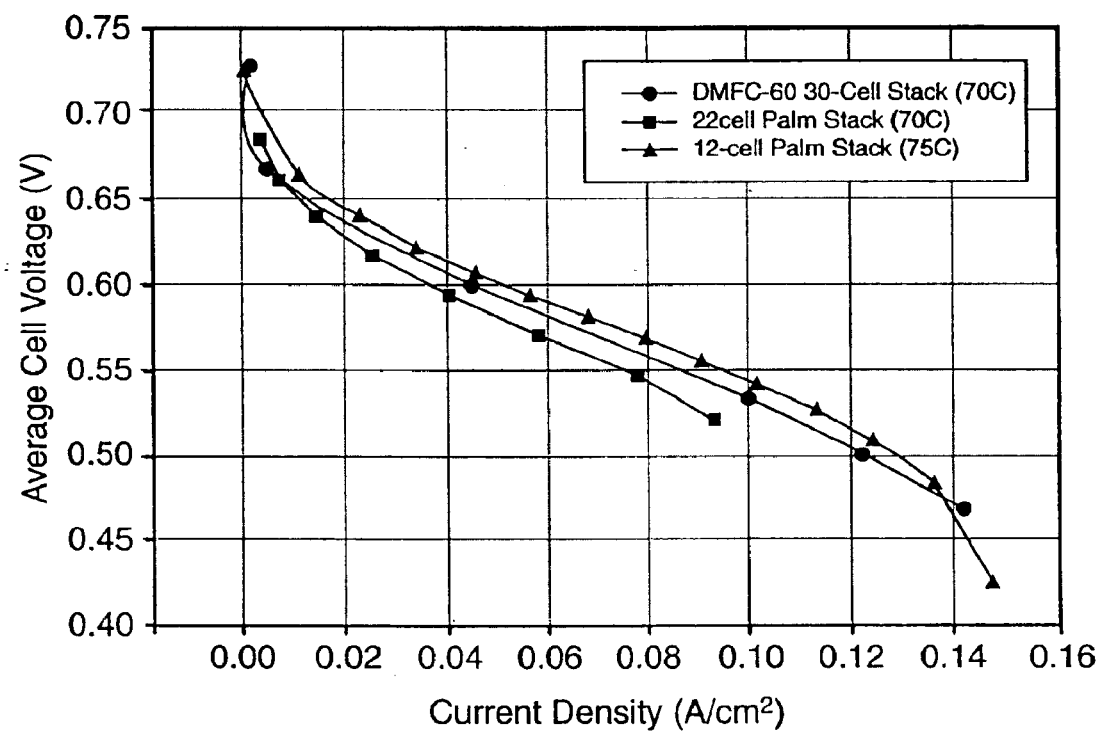
FIG. 1 graphically shows comparison performance plots for various direct methanol fuel cell stacks.
Figure 2:
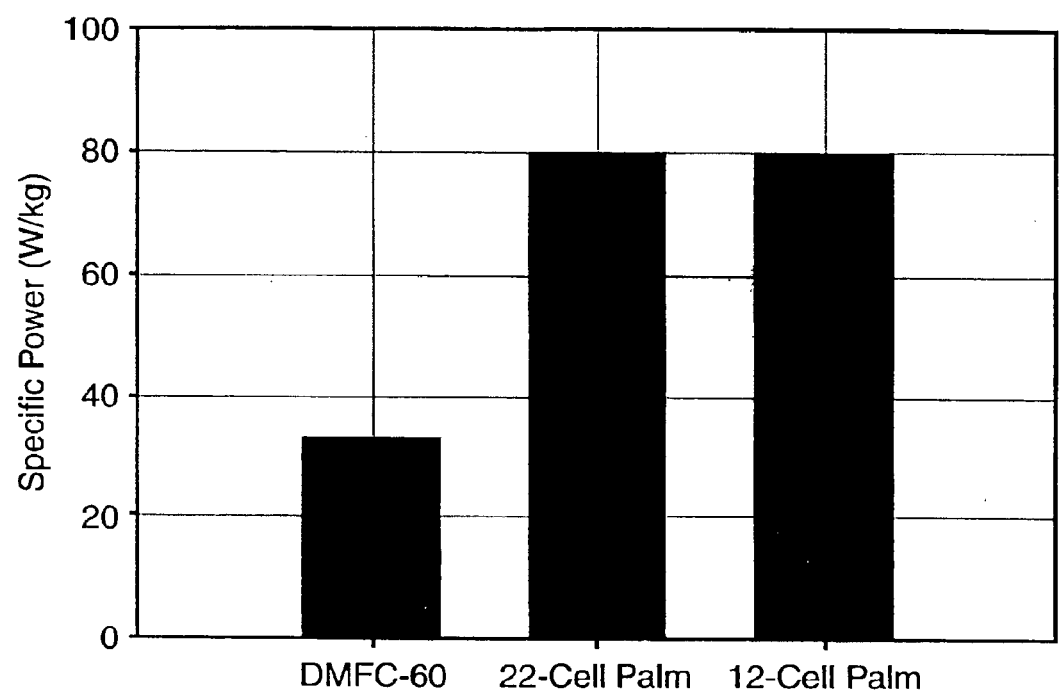
FIG. 2 graphically shows power density comparison for various direct methanol fuel cell stacks.

Fuel cell technologies continue to provide new and innovative designs for fuel cells. The fuel cell and fuel cell stack embodiments according to the present invention take another step in reducing the fuel cell footprint, reducing the fuel cell stack volume, and increasing fuel cell and fuel cell stack power output and power density.

The primary elements comprising the present invention are: 1) bipolar plates and corresponding fuel flow-fields; 2) gas/reactant diffusion layers or "backings"; 3) catalyzed membranes or membrane/electrode assemblies (MEAs); and, 4) end-plates. Some features of the present invention, e.g., selection of anode and cathode backing materials, improved dimensional tolerances, and improved flow-field designs, provide improved performance and stability for operation with dilute liquid methanol feed and non-humidified reactant air, low reactant pressure and low air-supply stoichiometry. Other features, e.g., use of symmetrical bipolar plates, flow-field and gasket designs, and use of inserts to isolate the channels in the seal region, improve ease of fabrication, durability of the components, and uniformity of cell operation within the stack. Lastly, component features, e.g., use of carbon paper backings, thinner bipolar plates, multifunctional endplates, and improved dimensional tolerances, enable reduction in stack size and weight.

Bipolar Plate/Flow-Field Design

In many applications the minimization of the fuel cell stack footprint and maximization of the active area is desirable. In order to achieve this goal, in one embodiment, shown in FIGS. 3a and 3b, bipolar plate 10, having a generally circular cross-section, comprises first side 12 and second side 14. Cathode manifold inlet 60 and outlet 65 are coupled by channels 70, 71 that are nested in a serpentine (back and forth) pattern. Serpentine flow channels 70, 71 define cathode active area 40 on first side 12. Anode manifold inlet 50 and outlet 55, offset 90° (orthogonal) from cathode manifold inlet 60 and outlet 65, are coupled by nested serpentine flow channels 72, 73 that define anode active area 41 on second side 14.

In order to minimize the overall bipolar plate footprint, tie-bolt holes 20 are located between anode manifold inlet 50 and outlet 55, and cathode manifold inlet 60 and outlet 65 within the circular cross-section defined by bipolar plate 10. Thus, the bipolar plate footprint is smaller when compared to designs with externally located tie-bolts.

Serpentine flow channels 70, 71, 72, and 73 provide for a uniform temperature distribution across the fuel cell footprint. Since the fuel cell stack operates on a dry air feed, there is a limited temperature envelope in which the temperatures are sufficiently high for good kinetics, but low enough that drying of the polymer electrolyte membrane is avoided. Consequently, using serpentine flow channels 70, 71, 72, and 73 to minimize variation in temperature across the fuel cell provides for larger, optimum active areas 40, 41.

Note that with flow channels 70, 71, 72, and 73 centered on active areas 40, 41, bipolar plate 10 may be flipped and turned 90°, thus swapping the anode and cathode flow channels. This is useful during development when various interchangeable permutations may be tested. Also, if the anode and cathode flow-fields are basically the same design, a plate with an out of tolerance flow channel field can possibly be used (say, on the more tolerant anode side) rather than rejected.

Figure 3A:
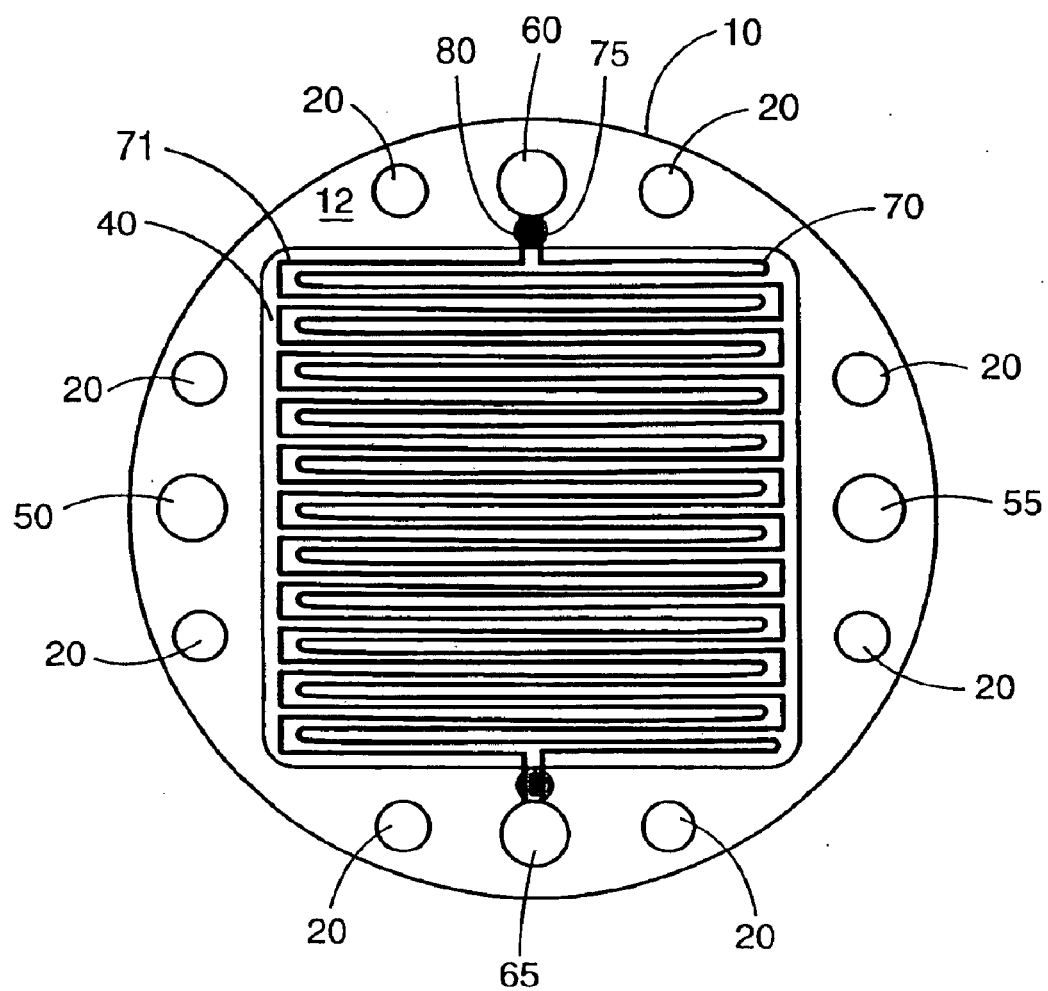
FIGS. 3a, 3b, and 3c are pictorial illustrations of the present invention bipolar plate design.
Figure 3B:
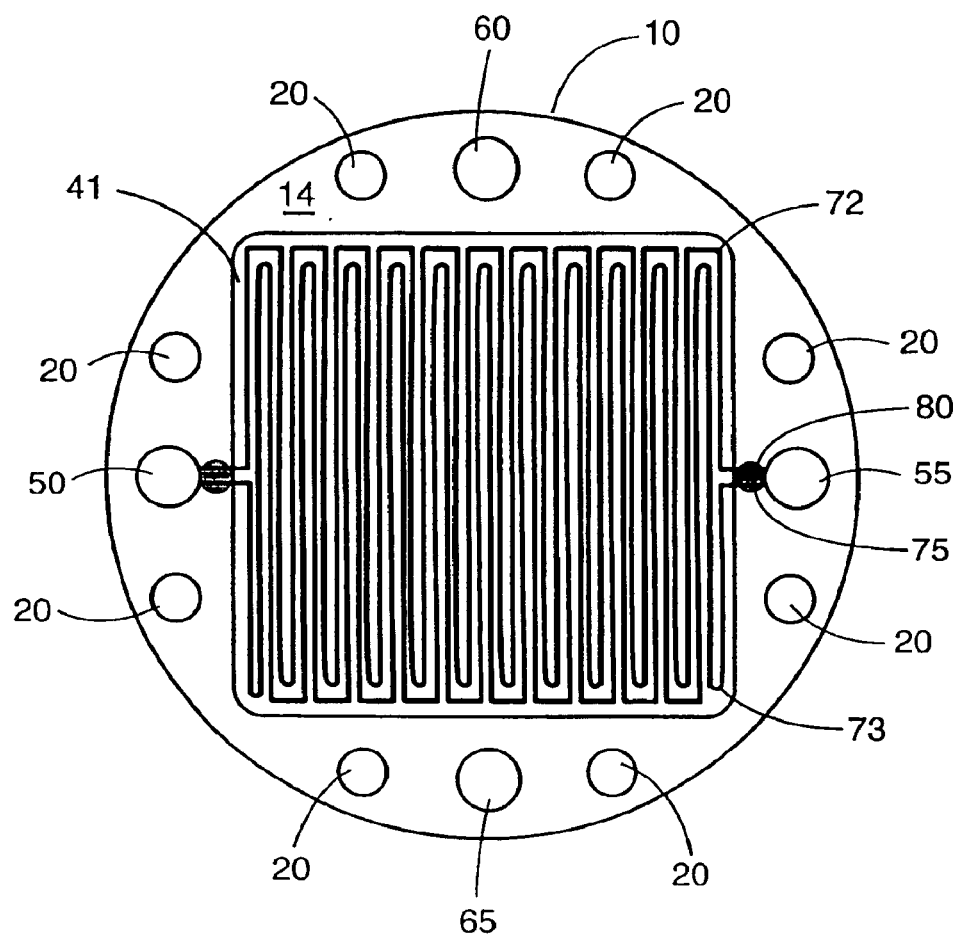

While a nested serpentine flow channel design is shown in FIGS. 3a and 3b, other configurations are possible. A single-channel serpentine flow field embodiment (not shown) has shown the highest single-cell performance, but pressure drops proved too high for efficient system operation. For example, on the cathode side, the parasitic losses incurred in compressing the air to overcome such high pressure-drops was too great to provide a practical working design. Since pressure drop with laminar flow is roughly directly proportional to velocity, the nested serpentine flow channel design of the present invention with only half the velocity of a single-channel serpentine flow field requires only one quarter the pressure drop necessary to provide the equivalent flow in equivalently sized channels in a single-channel embodiment.

The dimensions of the flow channels affect reactant pressure drop. In one embodiment of the invention, channels 70, 71, 72, and 73 are 0.8 mm (0.032") wide and separated by ribs 0.8 mm wide. In general, narrower channels and ribs provide better performance, as the use of wider ribs unduly limits reactant access to those areas over the ribs. However, ribs that are too narrow are more fragile and can decrease interfacial contact areas to a degree that cell resistances are observed to increase. In general, the design target for channel width to rib width ratio is approximately 1:1. However, this could vary by as much as 2× in either direction and still yield functional designs.

The depths of channels 70, 71, 72, and 73 directly affect reactant pressure drop. The primary factor influencing the selection of channel depth is the choice of a gas diffusion layer ("backing") material and is discussed in that section. Channel depths may range from 0.005"–0.050". Other factors that influence the choice of channel depth are fine-tuning of the reactant pressure drop and thickness of the bipolar plate (as shallower channels allow the use of thinner plates).

Serpentine channels 70, 71, 72, and 73 are structurally supportive. The most compact embodiment of this design utilizes bipolar plates that are on the order of 0.75 mm (0.030") thick with 0.25 mm (0.010") deep flow-field channels on both sides. This leaves a "web" only 0.25 mm thick between the channels on each side of a bipolar plate at the intersecting locations. Incorporating the orthogonal channel patterns of the present invention, the vulnerable web areas are small and relatively well protected. Conversely, if the ribs formed on either side of the bipolar plate coincide with one another, the continuous web area runs the width of the flow-field; such plates may readily crack in these regions.

Another consequence of the serpentine channel design is that the reactants can flow either way through the fuel cell stack and the internal temperature profile is always symmetrical, and, thus, maintains a constant efficiency. This is in contrast with concurrent flow designs, where the temperature profiles within the fuel cell stack can be different if the inlet and outlet for one of the reactants is swapped.

Figure 3C:
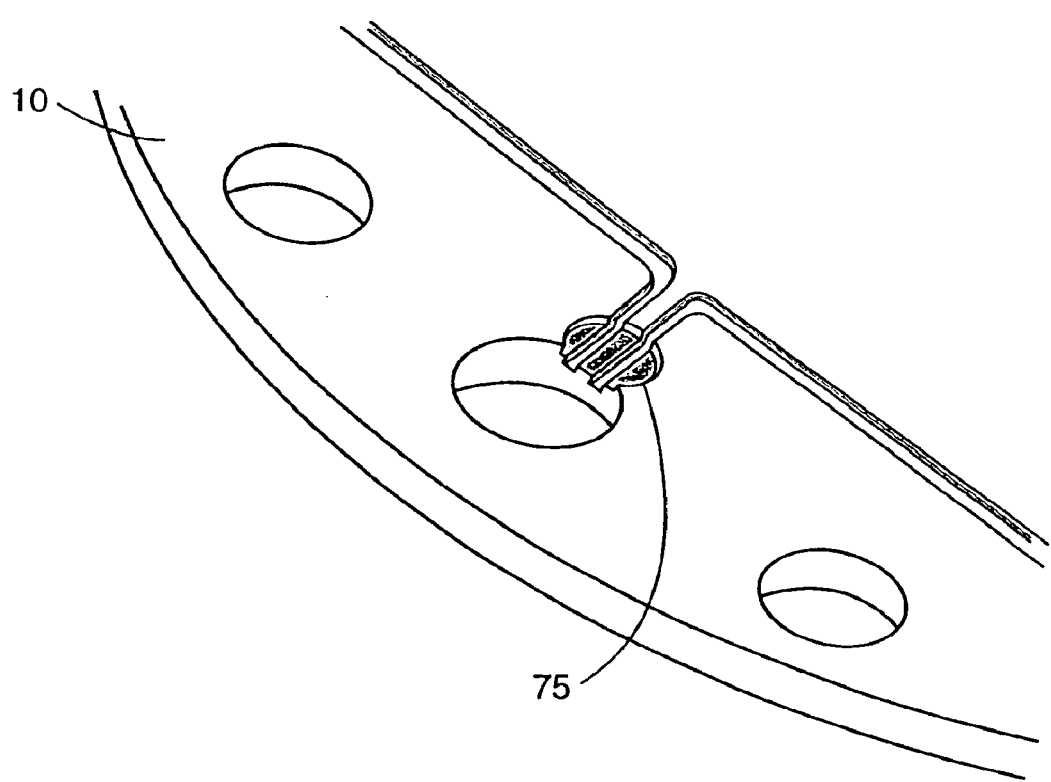

Small depressions 75, in the areas where serpentine channels 70, 71, 72, and 73 connect to anode manifold inlet 50 and outlet 55, and cathode manifold inlet 60 and outlet 65, are used to hold thin inserts 80. FIG. 3c is a magnified view of bipolar plate 10 detailing small depression 75. Thin inserts 80 comprise a rigid material that prevent the edges of a diffusion backing or a gasket material from obstructing the flow channels in these areas. A preferred material composition of thin inserts 80 is a fiberglass reinforced resin material (e.g., NEMA G-10).

In one embodiment, carbon-based materials are used for bipolar plates 10. Carbon-based plates are chosen for corrosion resistance and electrochemical interface stability. Appropriate carbon materials are graphite composites, impregnated pyrolyzed graphites, and resin-filled graphitic papers or cloths. While serpentine channels 70, 71, 72, and 73 have been machined to date, moldable carbon composites may provide for an inexpensive bipolar plate.

Gas Diffusion Layers ("Backings") and Seal Design

Figure 4:
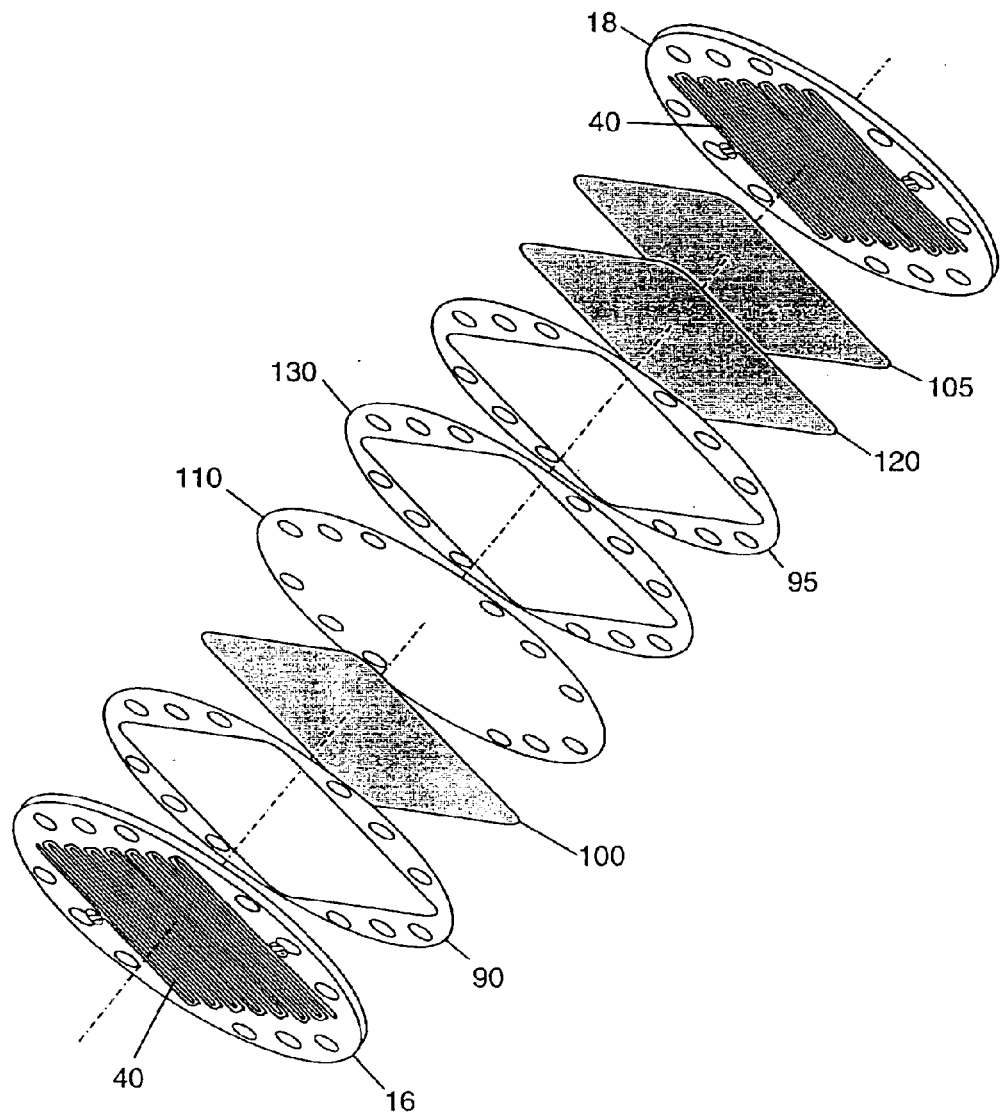
FIG. 4 is an exploded view of the present invention bipolar plate unit cell.

Referring to FIG. 4, one embodiment of a bipolar plate unit cell has first bipolar plate 16 with the cathode side facing the anode side of second bipolar plate 18. Placed between plates 16, 18 is an active region, comprising cathode gasket 90, cathode gas diffusion layer (or "backing") 100, catalyzed polymer electrolyte membrane 110, polyester film mask 130, anode gasket 95, anode microporous film layer 120, and anode gas diffusion layer 105.

Various forms of cloth backings may be used as gas diffusion layers 100, 105. Each form includes carbon black and a perfluoropolymer impregnated on carbon cloth. The properties of the various cloth backings are dependent upon the amount and method of fill as well as the ratio of perfluoropolymer to carbon black. As examples, the fill can be applied to only one side of the cloth, thus forming a "single-sided" backing, or a high ~50%) perfluoropolymer content can be used, to form a fully "hydrophobic" version. In one embodiment, ELAT® backings supplied by E-Tek, Inc. are used. The cloth backing typically used for the cathode is the double-sided, perfluoropolymer impregnated ELAT® backing. A high perfluoropolymer content in the cathode forestalls flooding.

In one embodiment, a cloth anode backing has a lower perfluoropolymer content (<40%), and is known as a "hydrophilic" backing. The permeability and retention of the dilute methanol liquid used as a fuel was enhanced in low perfluoropolymer content backings, because the pores are more open as well as more hydrophilic. However, this increase in fuel access can result in increased crossover of the fuel to the cathode side.

The use of such highly deformable backing materials requires very high compression forces to assure good in-cell conductivity and performance. The initial compression forces may need to be as high as 35 atm (500 psi) to attain optimum performance with cloth backings, but this may be reduced to as low as 3.4 atm (50 psi) depending on backing and gasket materials choices.

As the above description illustrates, the use of cloth backings is problematic. Consequently, In another embodiment, carbon paper backings are used as gas diffusion layers 100, 105 instead of carbon cloth. Carbon papers are relatively rigid thin structures formed by pyrolyzing a binder-reinforced non-woven carbon fiber paper. The primary suppliers of carbon papers for backings are Spectracorp, Toray, and SGL.

Carbon papers can be modified in a variety of ways such as impregnation with perfluoropolymer, impregnation with polysulfone, impregnation with hydrophilic materials, or a microporous adlayer can be applied to one face. The microporous adlayer is a hydrophobic structure with sub-micron pores, preferably thinner than 100 microns. The microporous adlayer is used to maintain open pathways for the reactants at the interface. An example of a carbon paper with an adlayer applied to one face is "GDL 30DC" manufactured by SGL.

Additionally, freestanding microporous film layer 120 may be positioned against one face of anode backing 105 to serve the function of the adlayer, allowing anode backing 105 to be "hydrophilic" while microporous layer 120 is hydrophobic. Freestanding microporous films such as the Carbel® "MP" series are available from W.L. Gore & Assoc, Inc.

In one embodiment, hydrophilic carbon paper is used for anode backing 105 (either untreated or lightly treated with polysulfone binder for improved mechanical strength and fracture resistance characteristics) in conjunction with a Carbel MP microporous film against the anode catalyst layer. The hydrophilic paper provides ready access of the reactant liquid to the close proximity of the catalyst layer and the microporous film helps protect the catalyst layer from dissolution and alleviates the effects of gas blinding by the evolved carbon dioxide.

In one embodiment, cathode backing 100 is a carbon paper treated with approximately 15 wt % perfluoropolymer without the use of a microporous layer. Avoiding the microporous structure mitigates the longer-term uptake of water and consequent loss in reactant access and performance. The fuel cells operate slightly drier overall than with the microporous elements or cloth backings, which is, however, more than compensated for by increases in cathode reactant accessibility to the electrode. Stack performance stability is also enhanced, as the likelihood of individual cathodes flooding at moderate current densities is reduced.

The carbon paper embodiment requires lower clamping pressure than cloth to form highly conductive interfaces. A significant benefit of the lower clamping pressure is that thin (0.015") and light bipolar plates may be used. A reduced deformation of the carbon papers into the flow channels means that the channels can be formed with a shallower depth than when cloth backings are used. Shallower channels are conducive to thin plates. Reduced deformation and uniform material characteristics of carbon paper provide a consistency and uniformity of pressure drop from cell to cell.

Gaskets 90, 95 contain multiple penetrations for anode manifold inlet 50 and outlet 55, cathode manifold inlet 60 and outlet 65, tie-bolt holes 20, and active areas 40, 41 detailed in FIGS. 3a and 3b. The sealing afforded by gaskets 90, 95 must accommodate a wide range of ultimate gap thickness and still seal effectively. The choice of gasket material is one element in obtaining the desired combination of effective sealing and the correct compression of the backings.

Gaskets 90, 95 comprise, in one embodiment, a polyurethane foam on a polyester film (manufactured by Rogers-Bisco), that is relatively firm compared to silicone foam and can be relatively thin (0.3 mm (0.012")). Thus, extrusion of the gasket material is minimal compared with the material used in the cloth backing embodiment and much closer fits can be achieved between the gaskets and the paper backings. In another embodiment for cathode gasket 90 only, a 0.4 mm (0.017") thick polyurethane foam was used.

In yet another embodiment, gaskets 90, 95 used an incompressible, thin material on one side and a compressible, thick material on the other side, such that relatively wide variations in the compression levels can be tolerated while supplying adequate sealing. For example, a 0.8 mm (0.032") thick, porous silicone foam seal (manufactured by Rogers-Bisco) was formed on a glass-fiber reinforced, 0.1 mm (0.004") thick, perfluoropolymer sheet. The reinforced sheet stabilized the easily deformable foam and prevented any significant extrusion under compression.

The carbon cloth backings and gaskets are prepared by die-cutting or by using templates and scalpels. The backings are squares with rounded corners shaped to cover active areas 40, 41.

Gaps are often formed in-between deformable gaskets 90, 95 and malleable carbon cloth backings 100, 105. Therefore, it is desirable to protect the regions of membrane 110 that would be exposed to reactant flows in these gaps to minimize reactant crossover and isolate a potential failure site, especially during break-in on hydrogen.

In order to address this concern, in one embodiment, 0.012 mm (0.0005") thick polyester film mask 130 is inserted between anode microporous film layer 120 and catalyzed polymer electrolyte membrane 110. Mylar® is a preferred polyester film for mask 130. Mask 130 shares the same outer dimensions as gaskets 90, 95, however, the cut-out dimensions for active areas 40, 41 are made such that mask 130 overlaps gas diffusion layers 100, 105 and covers any gaps that may occur. This protects membrane 110 in these regions. Since die-cutting is difficult with polyester film, mask 130 is cut-out of a polyester film sheet using a metal template and a fine-tip soldering iron to melt-cut through the desired regions.

Fuel Cell Stack Design

Figure 5:
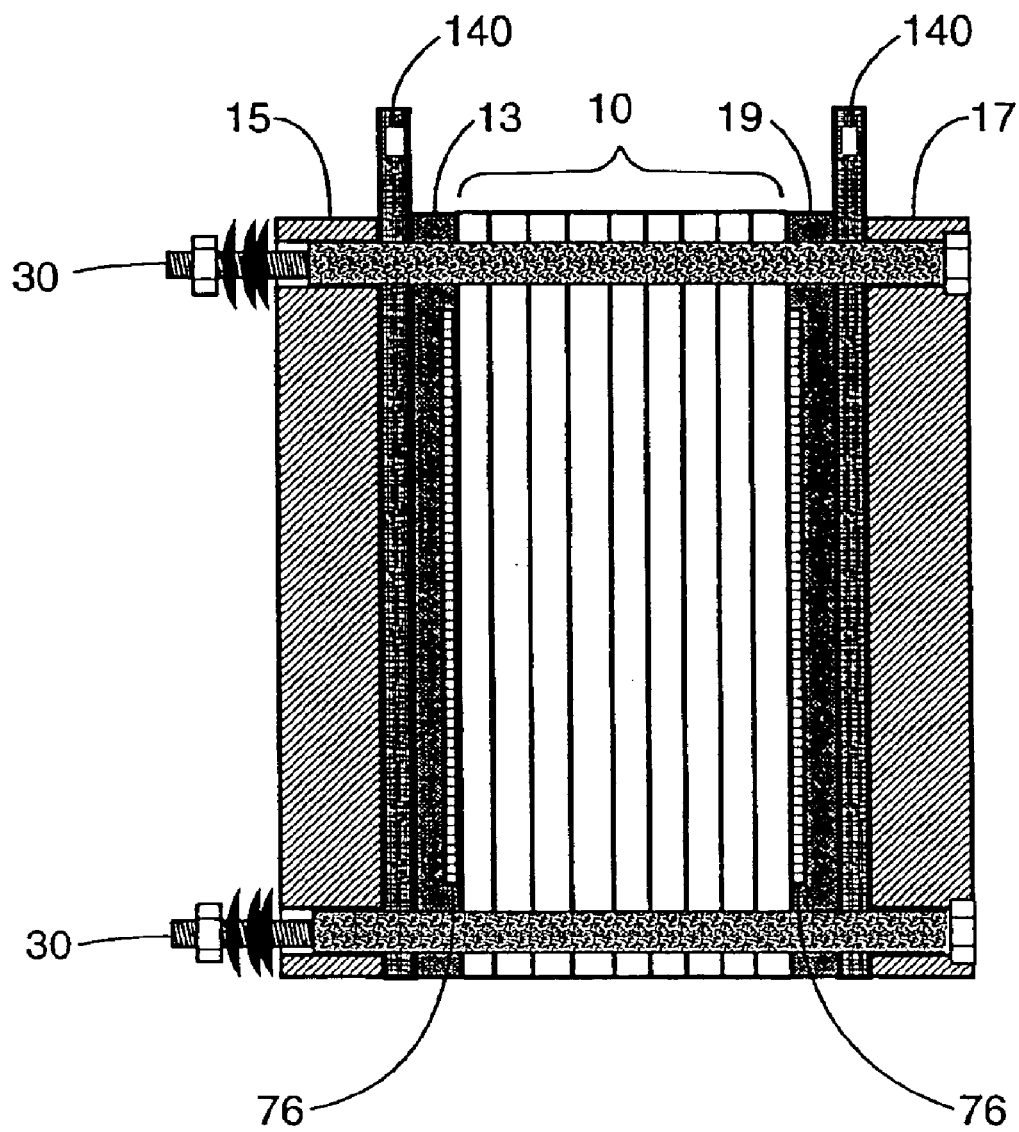
FIG. 5 is a pictorial illustration of one embodiment of the present invention fuel cell stack design.

Referring now to FIG. 5, bipolar plates 10 are sandwiched in-between uni-polar plates 13, 19. Uni-polar plates 13, 19 are identical to bipolar plates 10 except that serpentine channels 76 defining active area 40 exist only on the side facing bipolar plates 10. Thus, uni-polar plate 13 and next bipolar plate 10 comprise the first fuel cell on one end of the fuel cell stack. Current collectors 140 are placed in-between uni-polar plates 13, 19 and endplates 15, 17.

Locating tie-bolt holes 15 within the body of bipolar plate 10 permits endplates 15 to occlude only so much area as bipolar plates 10, as compared to externally located tie-bolts. Also, the location of tie-bolts 30 allow tie-bolts 30 to be used as alignment pins as the fuel cell stack is assembled. Bipolar plates 10 and uni-polar plates 13, 19 are designed to have circular cross-sections in order to minimize the fuel cell footprint and maximize the active area. However, a circular cross-section also improves sealing around the periphery, as corners inevitably introduce areas where clamping pressures are not as uniform. Also, plates with circular cross-sections are more durable in handling and during the assembly process, as corners tend to be vulnerable and fragile.

Figure 6:
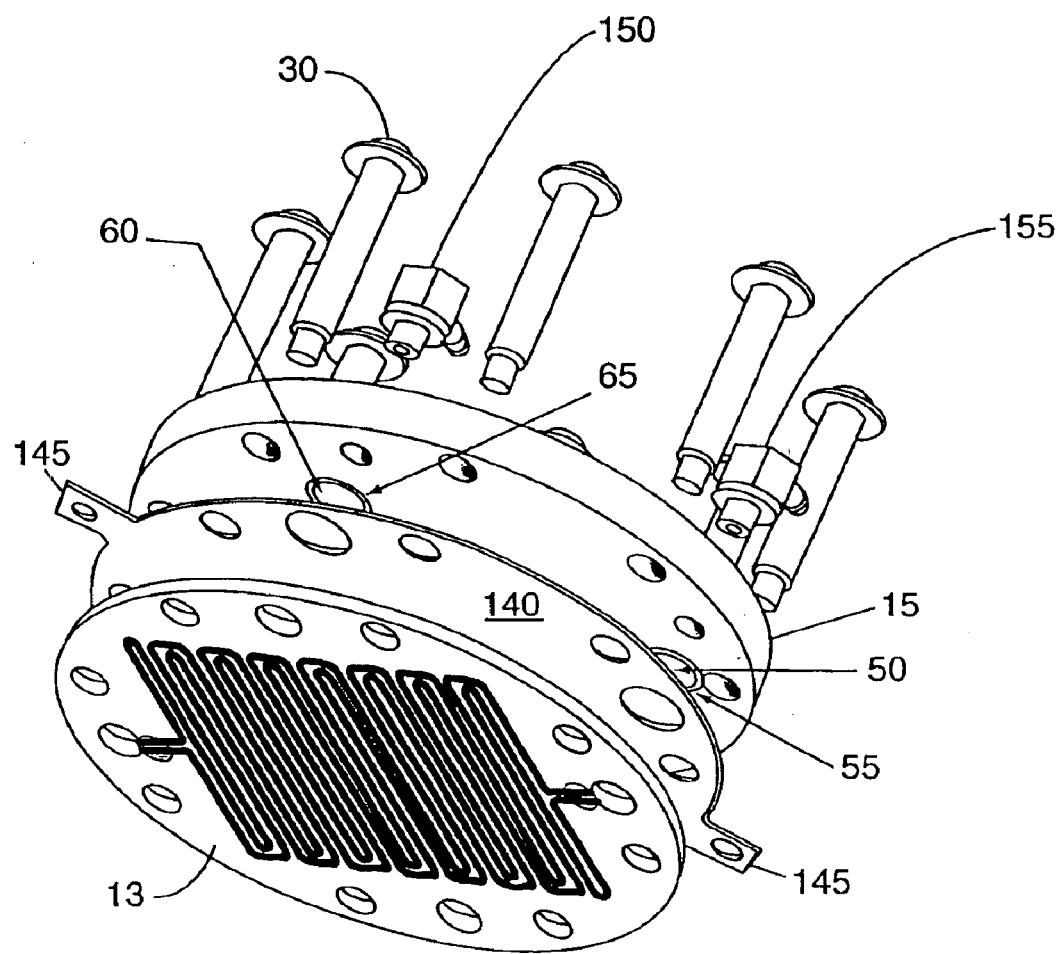
FIG. 6 is a pictorial illustration of an end plate assembly design.

Referring now to FIG. 6, in one embodiment, current collector plate 140 may be made from stainless steel although gold-coated copper is often used to minimize contact resistances and to resist corrosion. Other highly conductive materials, such as impregnated graphite, may also be used as current collectors. Collector plate 140 includes perforated square tab projections 145 for current and voltage taps. Thus, either spade terminals may be slipped on, or ring terminals bolted on, to affix the current leads to current collector plate 140.

The thickness of current collector plate 140, which may vary from as little as 0.127 mm (0.005") to as much as 3.175 mm (0.125"), and is chosen to allow sufficient compression of O-rings 55, 65 to provide an effective seal. For example, in one embodiment 0.8 mm (0.032") thick collector plates are used in conjunction with 1 mm (0.040") thick O-rings. O-rings 55, 65 fit within current collector plate 140, serving to isolate the reactant flows from current collector plate 140, thus, corrosion is not an issue with the current collectors.

Connections for reactant lines 150, 155 are provided via ports 50, 60 through endplates 15, 17 and are tapped for threaded fittings. The reactant flows pass through current collector plate 140 to distribution manifolds created by aligning ports 50, 60 within the stacked assembly of bipolar plates 10, uni-polar plates 13, 19 and endplates 15, 17. Ports 50, 60 are large enough to accommodate O-rings 55, 65.

Endplates 15, 17 are used to "tie" the fuel cell stack together, and, therefore, must be able to provide the compression needed without undue deflection in order to enable the optimum electrical connectivity between all the interfaces within a single cell or the fuel cell stack as a whole. The compression forces in polymer electrolyte fuel cells (PEFCs) are particularly high, as 300 psi (20 atm) levels are not uncommon, especially with cloth backings. Compressive pressures may range from about 50 psi (3.4 atm) to about 500 psi (35 atm). Note that the previously mentioned carbon paper embodiment requires lower clamping pressure than cloth to form highly conductive interfaces. A significant benefit of the lower clamping pressure is the use of thin bipolar and uni-polar plates (0.381 mm to 6.35 mm (0.015"–0.25")) and thin endplates (2.54 mm to 25.5 mm (0.1"–1")) in the fuel cell stack design. Endplates 15, 17 also provides reactant connections to manifolds 50, 60. In one embodiment, endplates 15, 17 are formed from a carbon fiber/resin composite that provides a very high flexural strength when compared to metal embodiments, but at a lower weight.

Figure 7:
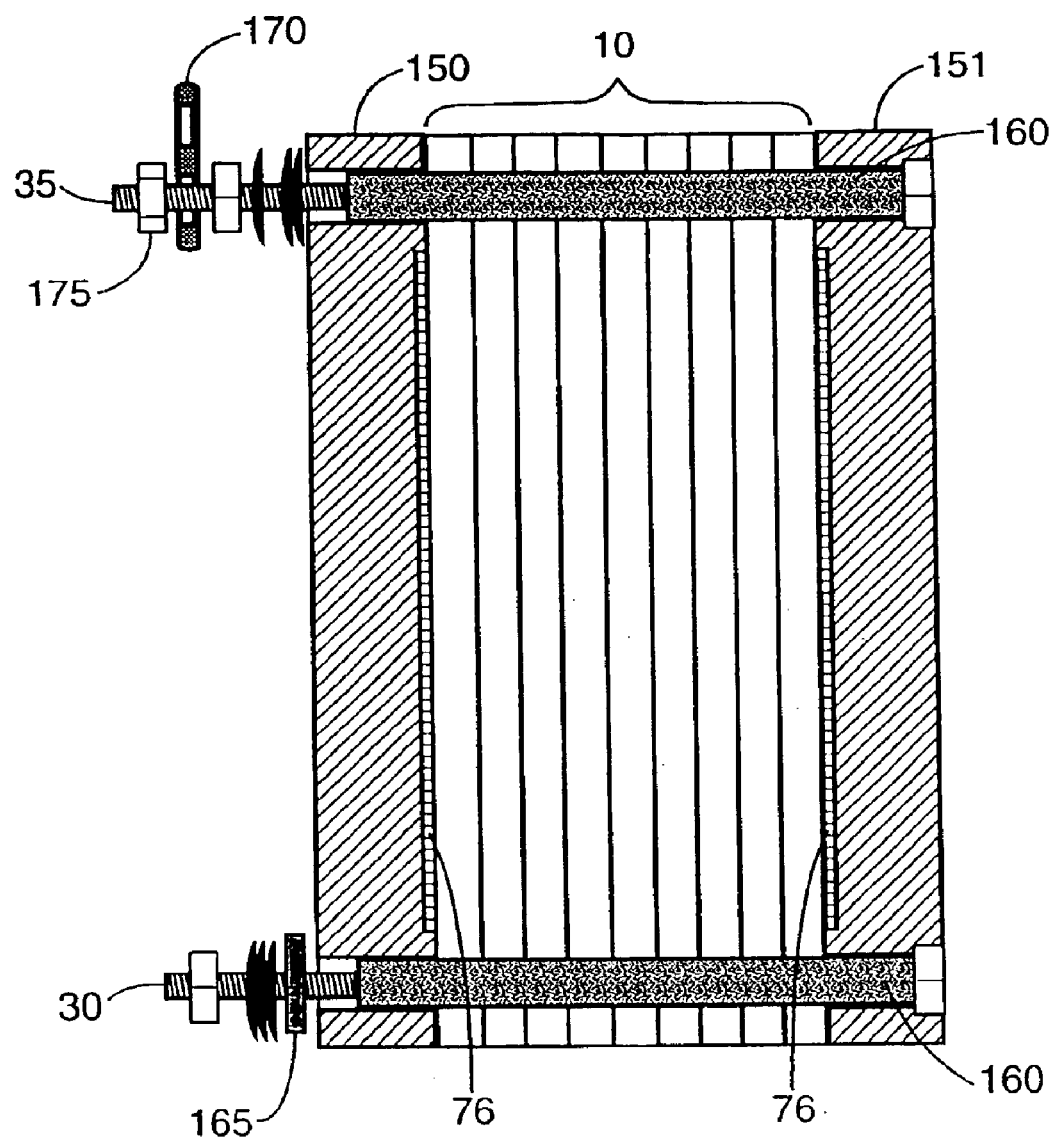
FIG. 7 is a pictorial illustration of the multifunctional endplate fuel cell stack design.

Another endplate embodiment effectively combines the various functions of a uni-plate, current collector plate, and endplate into one multi-functional endplate. FIG. 7 illustrates a fuel cell stack using multi-functional endplates 150, 151. By combining functions, multi-functional endplates 150, 151 reduce the size, weight, and complexity of the fuel cell stack. In one embodiment, multi-functional endplates 150, 151 are a carbon-carbon composite material. In another embodiment, multi-functional endplates 150, 151 are constructed of graphite plate material AXF-5QCF, manufactured by POCO, Inc.

A typical carbon-carbon composite multi-functional endplate is formed from a stack of woven carbon fiber mats bound together by a pyrolyzed resin. Thus, the carbon-carbon composite is similar to resin-bonded carbon fiber composites, such as those used as lightweight structural materials in aerospace applications. The much higher fiber loadings and the conductive carbon binder created by pyrolyzing the resin results not only in higher heat tolerances, but, also, in material conductivities many orders of magnitude higher than the aerospace-type materials (bulk conductivities over 700 S/cm compared to less than 1 S/cm).

In this embodiment, a "fastener" grade structural carbon-carbon composite from Fiber Materials, Inc., was used. The faces of the plates were planed down to a total thickness of about 2.54 mm to 25.5 mm (0.1"–1"). The plates were impregnated with a methyl methacrylate monomer, which was polymerized using AIBN [2,2'-Azobis(isobutyronitrile)] as the free-radical initiator. Excess methacrylate on the surfaces was wet-sanded away using 320 grit SiC paper. This processing ensured that the plates were sufficiently gas-tight for use. In other embodiments, multi-functional endplates were procured that were commercially vacuum/pressure impregnated, which resulted in significantly better gas tightness.

Still referring to FIG. 7, serpentine channels 76 are machined into the bipolar plate 10 side of each multi-functional endplate 150, 151. Since multi-functional endplates 150, 151 also serve as current collectors, tie-bolts 30 are electrically isolated by using non-conductive bolt sheaths 160 and insulator washers 165. The electrical connections for carrying the current generated by the stack are provided by connecting electrical leads to un-insulated tie-bolt 35. Ring terminals 170 are affixed by additional nuts 175. This electrical lead connection approach is necessary as threaded connections strip out fairly easily in graphite material. Any of the tie-bolts can be electrically connected on either side of the stack, for multiple current or voltage connections.

The connections for the reactant supply fittings (not shown) may be tapped into multi-functional end-plates 150, 151 or inserts may be used. A preferred insert embodiment would induce compressive forces on the plate (e.g., a flange on the far side) rather than shear forces, as a standard helical insert would induce.

One version of the multi-functional endplate embodiment using commercially impregnated plates was tested in a 22-cell fuel cell stack. While using Belleville washers for the electrical connections against the plates resulted in electrical resistances of about 20 milliohm, the use of serrated Belleville washers decreased this to around 2 milliohm.

In any embodiment, using the tie-bolt fasteners on at least one end, the fasteners may be recessed into the surface of the endplate to provide a lower profile envelope. Threaded flanged inserts of stainless steel or similar material may be inserted into the tie-bolt wells to bear the load and protect embodiments comprising graphite.

Stack Testing Design

A fuel cell within a stack may under-perform under certain operating conditions and may be permanently damaged if the load is not decreased in short order. To address this concern, the voltages of the individual cells are monitored for protection. The voltage taps to the individual cells within the stack have been accomplished by two separate means.

Figure 8:
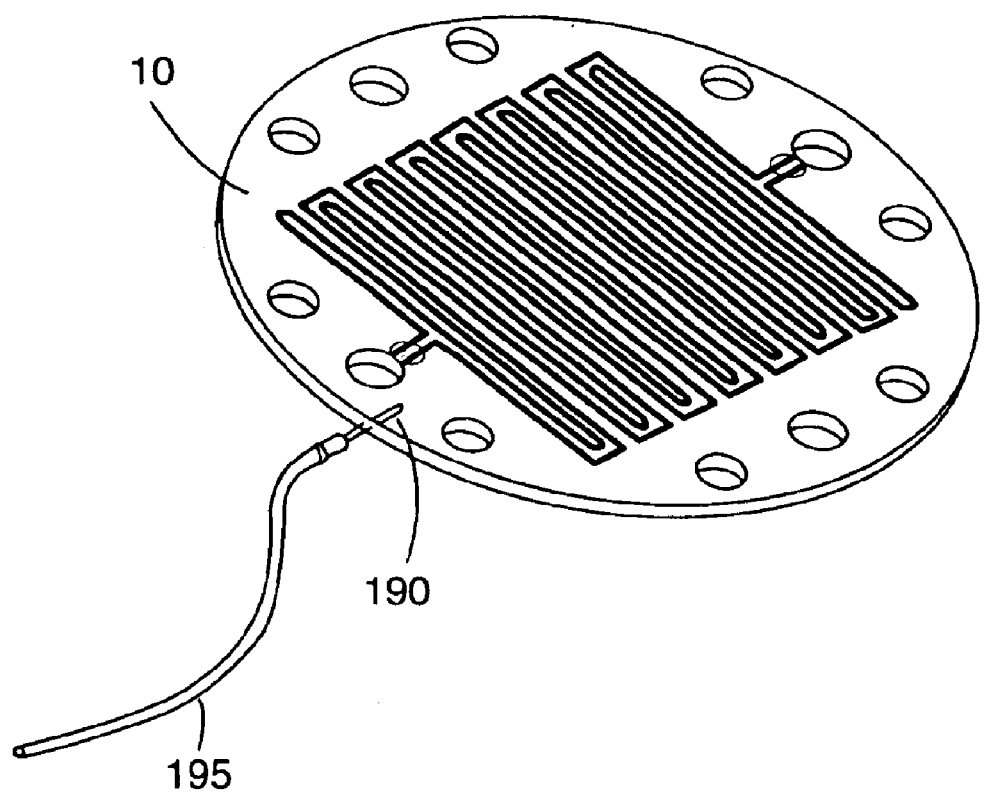
FIG. 8 is a pictorial illustration of a bipolar plate with voltage tap.

Referring to FIG. 8, in stack embodiments that used thick (1.78 mm [0.070"] or more) bipolar plates, pin channels 190 are machined into bipolar plates 10 tangential to the edge in the sealing area. Pin connections 195, of the type used for integrated circuit sockets (i.e., a solder socket on one end and a pin for insertion into an integrated circuit socket), are press-fit into pin channels 190 and held in place after stack assembly by the compressive force of the seals.

Alternatively, and if space permits, individual receptacles for the pin connections can be press fit instead into the individual channels. For testing, pins soldered to a ribbon cable are inserted into the receptacles for each individual plate. If mishandled, the pins pull out rather than the receptacles. Since the receptacles are nearly a millimeter in diameter, this approach is difficult with thin bipolar plates.

Figure 9:
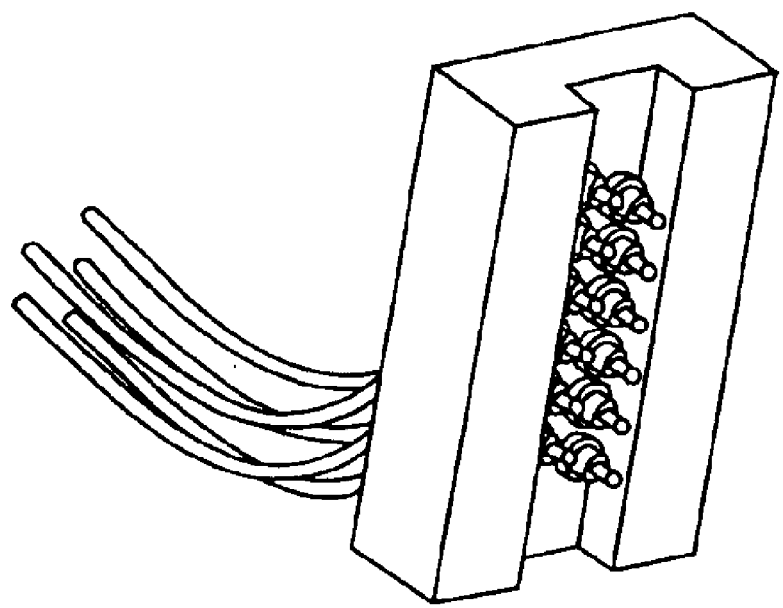
FIG. 9 is a pictorial illustration of a voltage measurement fixture.

Referring to FIG. 9, a more versatile approach for a voltage measurement fixture is to use spring-loaded pins fixtured along a beam that can be strapped to the side of the stack. The individual spring-loaded pins push against the edges of their respective plates to achieve electrical contact. The distance between the pins is chosen to roughly match the pitch of the cells within the stack. If the packing is too tight, the pins are alternately off-set to accommodate finer pitches.

Stack Performance

Figure 10:
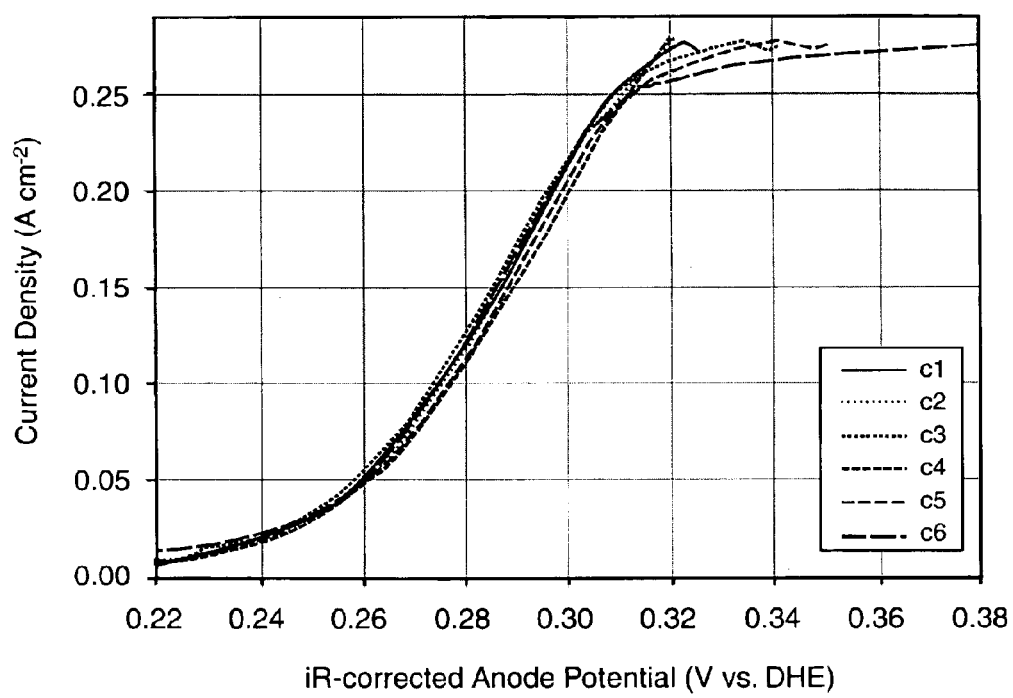
FIG. 10 graphically shows 6-cell stack anode polarization plots.

The performance results for one particular 6-cell stack embodiment utilizing carbon paper backings is shown in FIG. 10. The current density for each cell is displayed. The anodes were backed with untreated carbon paper 0.20 mm (0.080") thick combined with Carbel MP microporous layers. The cathodes were backed with 0.25 mm (0.010") thick Toray paper treated with 15 wt % FEP 121A (Teflon™). The flow channels were double serpentine with 0.8 mm (0.032") wide and 0.25 mm (0.010") deep channels. Pressure drops under normal operating conditions (i.e., 3 ml/min/cell MeOH and 100 sccm/cell air) were at the design point of 0.2 bar (3 psig).

A key metric for judging stack performance is the uniformity of operation of the constituent cells. The anode performances are quantified by using the cathodes as dynamic hydrogen evolution (DHE) reference electrodes. In this case, air at the cathodes is replaced with hydrogen to provide the relatively constant and stable hydrogen evolution reaction instead of the much more variable oxygen reduction reaction (ORR) as a reference.

As shown in FIG. 10 for the paper-based 6-cell stack, the anode performances are all quite uniform up to the limiting current densities somewhat over 0.25 A/cm$^2$. Since the region of interest for efficient operation of the fuel cell is closer to 0.1 A/cm$^2$, any differences in the limiting currents will not affect fuel cell performance. If higher current densities are desired (i.e., for maximum power) the limiting currents can be substantially increased merely by increasing the anode feed methanol concentration.

Figure 11:
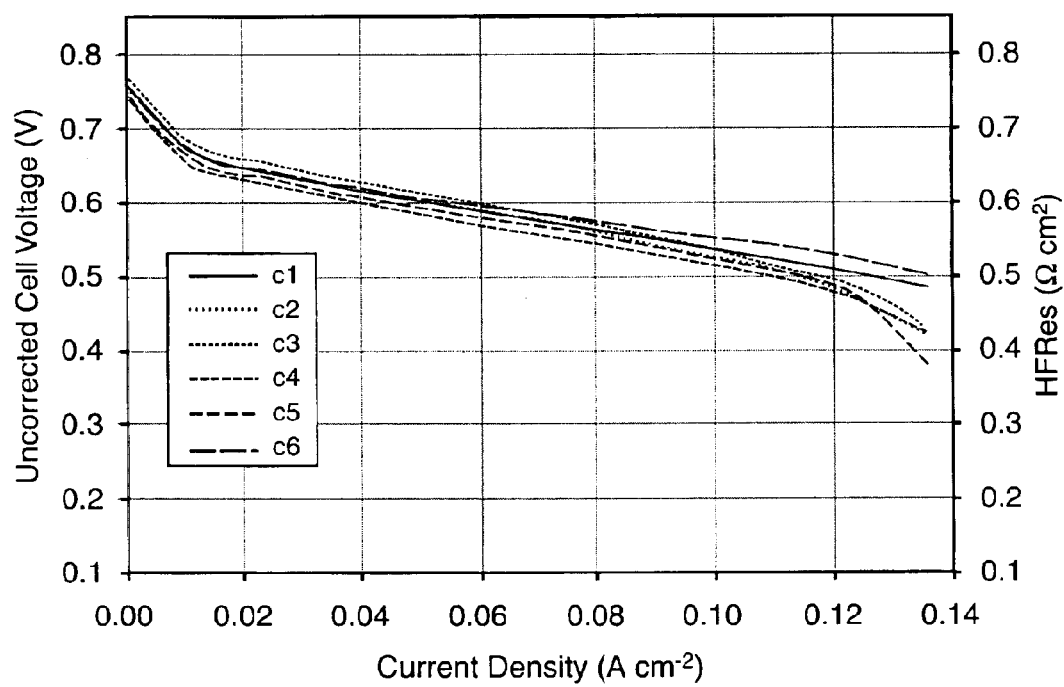
FIG. 11 graphically shows 6-cell stack DMFC performance plots.

The more relevant gauge of cell uniformity and stack performance is actual DMFC performance. FIG. 11 depicts polarization curves for the aforementioned 6-cell stack operating under "standard" methanol/air feed conditions (i.e., 3 ml/min/cell 0.3 M MeOH and 100 sccm/cell air). Air is supplied to the stack at near-ambient temperature and is non-humidified. Temperature of the stack is controlled to some degree by the temperature of the anode liquid feed, but the stack self-heats to about the 75° C. level due to waste heat. Since the air enters cool and exits very close to stack temperature, the reactant air experiences a substantial temperature increase.

The serpentine channel configuration serves to minimize the potentially detrimental effects of wide temperature gradients across the stack. As can be seen in FIG. 11, the cells are uniform at low current densities up through the mid-range, the region of principal relevance for power systems. There is some variation in individual cell performances at the higher current densities where mass-transport limitations begin to dominate. However, it should be noted that the reactant flows are fixed and that the curves would tend to track more closely if the reactants were supplied at a constant stoichiometry (i.e., proportional to the current).

The largest embodiment built to date has been a 22-cell stack with cloth backings. Even this largest of stacks has proven to be tolerant of orientation. The 22-cell stack embodiment was operated with all of the reactant supply lines fed from one end-plate. This is desirable to minimize the space occupied by the stack and fittings and tubing within an enclosure, as all of the fittings can be connected to one side of the stack and the other side can be positioned against the wall of the enclosure. This ability suggests that that the reactant flows do not preferentially feed the cells nearest the ports to an excessive degree.

In another embodiment, a 12-cell stack was constructed. The 12-cell stack used the same basic configuration as the 22-cell stack, except that number of cells was reduced for system packaging purposes and the bipolar plates were thinned from 0.090" to 0.070". Also, the GDL was changed from the cloth-type used for the previous two stack designs to a much more rigid and engineering-friendly carbon paper type. This, in conjunction with more optimized flow-field dimensions reduced cell-to-cell performance variations and consequently more closely approached single-cell performances. By decreasing the severity and frequency of under-performing cells, a substantial increase in average cell current density over the 22-cell design was achieved (Reference FIG. 1).

Another contributor to improved stack performance was an increase in target operating temperature from 70° C. to 75° C. Also, the endplate material was changed to a more robust (yet less conductive) carbon composite. As a result, relatively heavy gold-coated stainless steel current collectors were employed on each end of the stack. It is important to note that even though the number of cells was reduced and components such as metal current collectors added inactive mass, the overall specific power remained constant at about 80 W/kg.

The foregoing description of the invention has been presented for purposes of illustration and description and is not intended to be exhaustive or to limit the invention to the precise form disclosed, and obviously many modifications and variations are possible in light of the above teaching.

The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A stack of direct methanol fuel cells, comprising:
   (a) at least one direct methanol fuel cell with a circular footprint,
   (b) a cathode manifold within said circular footprint,
   (c) an anode manifold within said circular footprint,
   (d) tie-bolt penetrations and tie-bolts within said circular footprint and spaced evenly around the circumference of said circular footprint stack,
   (e) said at least one direct methanol fuel cell comprising:
      (1) a first graphite-based material plate with a cathode active area defined by first serpentine channels connecting a cathode manifold inlet with a cathode manifold outlet,
      (2) a second graphite-based material plate with an anode active area defined by second serpentine channels connecting an anode manifold inlet with an anode manifold outlet, said first serpentine channels orthogonal to said second serpentine channels, and
      (3) an active region between said cathode active area and said anode active area, where said active region comprises in the following order: a cathode gasket, a cathode gas diffusion layer, a catalyzed polymer electrolyte membrane, a polyester film mask, an anode gasket, an anode microporous film layer, and an anode diffusion layer.

2. The apparatus of claim 1 where said cathode gasket defines tie-bolt penetrations and a first penetration further defined by said cathode active region.

3. The apparatus of claim 1 where said cathode gas diffusion layer is areally equivalent to said cathode active area.

4. The apparatus of claim 1 where said anode diffusion layer and said anode microporous film layer are areally equivalent to said anode active area.

5. The apparatus of claim 1 where said polymer electrolyte membrane includes tie-bolt penetrations.

6. The apparatus of claim 1 where said polyester film mask defines tie-bolt penetrations and a second penetration areally smaller than said anode microporous film layer thereby minimizing reactant crossover.

7. The apparatus of claim 1 where said anode gasket defines tie-bolt penetrations and a third penetration further defined by said anode active region.

8. The apparatus of claim 1 further comprising a first endplate located on a first end of said at least one direct methanol fuel cell and a second endplate located on a second end of said at least one direct methanol fuel cell, where said at least one direct methanol fuel cell is positioned therebetween.

9. The apparatus of claim 8 further comprising a first current collector, located between said first endplate and said at least one direct methanol fuel cell and a second current collector, located between said second endplate and said at least one direct methanol fuel cell.

10. The apparatus of claim 1 further comprising small depressions located where said first serpentine channels intersect with said cathode manifold inlet and outlet, and where said second serpentine channels intersect with said anode manifold inlet and outlet, and a thin insert of a rigid material placed within said small depressions that prevents obstruction of said first and second serpentine channels.

11. The apparatus of claim 10 where said rigid material comprises a fiberglass reinforced resin.

12. The apparatus of claim 1 where said graphite-based material is selected from the group consisting of: graphite composites, impregnated pyrolyzed graphites, resin-filled graphitic paper, and moldable graphite composite.

13. The apparatus of claim 1 where said first and second serpentine channels have a width of 0.8 mm (0.032"), and are separated by a rib of 0.8 mm (0.032").

14. The apparatus of claim 1 where said first and second serpentine channels have a depth from about 0.127 mm to 1.27 mm (0.005" to 0.050").

15. The apparatus of claim 1 where said cathode gas diffusion layer comprises a carbon cloth backing.

16. The apparatus of claim 1 where said cathode gas diffusion layer comprises carbon paper.

17. The apparatus of claim 16 where said carbon paper is treated with approximately 15 wt % perfluoropolymer.

18. The apparatus of claim 1 where said anode gas diffusion layer comprises a carbon cloth backing.

19. The apparatus of claim 1 where said anode gas diffusion layer comprises carbon paper.

20. The apparatus of claim 1 where said first and second graphite-based material plates has a thickness of about 0.381 mm to 6.35 mm (0.015"–0.25").

21. The apparatus of claim 8 where said first and second endplates material comprises a carbon-fiber resin composite.

22. The apparatus of claim 8 where said first and second endplates has a thickness of about 2.54 mm to 25.5 mm (0.1"–1").

23. The apparatus of claim 1 where said cathode gasket comprises polyurethane foam and polyester film.

24. The apparatus of claim 1 where said cathode gasket is polyurethane foam with a thickness of 0.4 mm (0.017").

25. The apparatus of claim 1 where said anode gasket comprises polyurethane foam and polyester film.

26. The apparatus of claim 1 where said cathode gasket has a thickness of about 0.3 mm (0.012").

27. The apparatus of claim 1 where said anode gasket has a thickness of about 0.3 mm (0.012").

28. The apparatus of claim 1 where said first and second graphite-based material plates outer edges define a pin channel, and an electrical pin is press-fit into said pin channel as a voltage tap.

29. The apparatus of claim 1 where said first and second graphite-based material plates outer edges define a pin channel, and a pin receptacle is press-fit into said pin channel as a voltage tap.

30. The apparatus of claim 1 further comprising a first multi-functional endplate located on a first end of said at least one direct methanol fuel cell and a second multi-functional endplate located on a second end of said at least one direct methanol fuel cell, where said at least one direct methanol fuel cell is positioned therebetween.

31. The apparatus of claim 30 where said first and second multi-functional endplates are a carbon-carbon composite material.

32. The apparatus of claim 30 where said first and second multi-functional endplates are a graphite plate material.

33. The apparatus of claim 30 where said first and second multi-functional endplates has a thickness of about 2.54 mm to 25.5 mm (0.1"–1").

34. The apparatus of claim 30 where said first and second multi-functional endplates are impregnated with a methyl methacrylate monomer.

35. The apparatus of claim 1 comprising a plurality of said at least one direct methanol fuel cell.

* * * * *